United States Patent [19]

Hattori

[11] Patent Number: 4,720,846

[45] Date of Patent: Jan. 19, 1988

[54] AUTOMATIC TELEPHONE ANSWERING AND RECORDING APPARATUS

[75] Inventor: Motoichi Hattori, Fujisawa, Japan

[73] Assignee: Tokyo Shibaura Denki Kabushiki Kaisha, Kawasaki, Japan

[21] Appl. No.: 519,417

[22] Filed: Aug. 1, 1983

[30] Foreign Application Priority Data

Jul. 30, 1982 [JP] Japan .................. 57-133516

[51] Int. Cl.[4] .............................. H04M 1/64
[52] U.S. Cl. ....................... 379/79; 360/31; 360/74.1; 379/75
[58] Field of Search ............ 179/6.13, 6.07, 6.09; 360/31, 32, 74.1, 74.2; 369/53, 23; 379/79, 75, 74

[56] References Cited

U.S. PATENT DOCUMENTS

| | | | |
|---|---|---|---|
| 3,925,617 | 12/1975 | Sato | 179/6.13 |
| 3,998,045 | 12/1976 | Lester | 381/51 |
| 4,125,865 | 11/1978 | Mohammadioun | 360/32 |
| 4,390,751 | 6/1983 | Jacobson | 179/6.13 |
| 4,469,919 | 9/1984 | Nakamura | 179/6.07 |
| 4,472,599 | 9/1984 | Jacobson | 179/6.13 |
| 4,500,753 | 2/1985 | Plunkett | 179/6.03 |
| 4,514,593 | 4/1985 | Hattori | 179/6.07 |
| 4,571,457 | 2/1986 | Hattori | 379/77 |
| 4,620,065 | 10/1986 | Hattori | 369/22 |

FOREIGN PATENT DOCUMENTS

| | | | |
|---|---|---|---|
| 978884 | 8/1975 | Canada | 179/6.07 |
| 11841 | 7/1973 | Japan | 179/6.07 |
| 11843 | 7/1973 | Japan | 179/6.07 |

OTHER PUBLICATIONS

National Semiconductor–Jun. 1981–DT 1051, Digitalker TM Speech Evaluation Kit.

Primary Examiner—Alan Faber
Attorney, Agent, or Firm—Finnegan, Henderson Farabow, Garrett & Dunner

[57] ABSTRACT

An automatic telephone answering and recording apparatus having recording means for recording an incoming message sent by a caller over a telephone line on a first recording medium; a speaking circuit; first means responsive to a call signal sent by the caller for operating to connect the speaking circuit to the telephone line associated with the caller; second means responsive to the first means for transmitting an answering message previously recorded on a second recording over the telephone line to the caller; detecting means responsive to an ending of the answering message for detecting the state of the recording means to determine whether it is ready to record an incoming message; and transmitting means responsive to the detecting means for transmitting to the caller a first aural synthesis output identifying the state of the recording means.

10 Claims, 12 Drawing Figures

AUTOMATIC TELEPHONE ANSWERING AND RECORDING APPARATUS

FIELD OF THE INVENTION

The present invention relates to an automatic telephone answering and recording apparatus useable as an answer-phone.

BACKGROUND OF THE INVENTION

Figure 1:
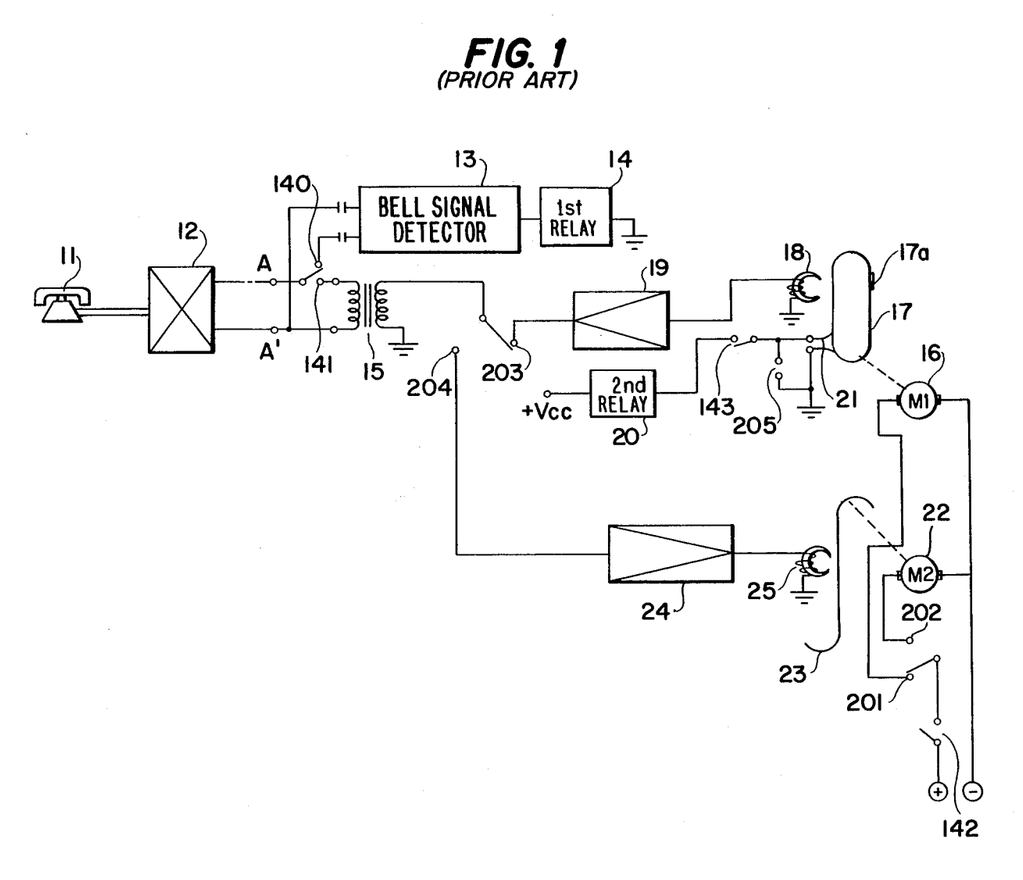
FIG. 1 shows the circuit configuration of a conventional telephone answering apparatus.

A conventional automatic telephone answering apparatus is shown in FIG. 1. When a call signal (ring signal) from a caller's telephone set 11 arrives via exchange 12, it is detected by a bell signal detection circuit 13 connected to exchange 12 through normally closed contact 140 of a first relay 14 as described below. Bell signal detection circuit 13 includes a timer which is started in response to detection of a calling signal to render first relay 14 of the self-hold type operative. This results in closure of normally open contact 141 of first relay 14 and establishment of a speaking path wherein telephone circuit A–A′ is connected to one side of line transformer 15.

At the same time, normally open contacts 142 and 143 of first relay 14 are closed and motor 16 is activated to the drive state through normally closed contact 201 of second relay 20 which is activated by closure of normally open contact 143 of first relay 14. Endless tape 17 is thus driven by motor 16 and plays back through playback head 18 a prerecorded reply message via playback amplifier 19 and a normally closed contact 203 of the second relay 20. This is transmitted by line transformer 15 to the caller's telephone set 11.

When the endless tape 17 has circled once, conductive foil 17a on tape 17 short-circuits a pair of electrodes 21 and the second relay 20 is made operative by normally open contact 143 of the first relay 14, which was previously in the open state. The second relay 20 becomes self-holding through closure of its normally open contact 205.

At the same time, normally open contact 202 of the second relay 20 is opened, thereby stopping motor 16 and activating motor 22 into the drive state. Translation of recording tape 23 is thus started by motor 22, permitting a message from the caller to be recorded on tape 23 via normally open contact 204 of second relay 20 which is now closed, recording amplifier 24, and recording head 25.

When the timer action of the bell signal detection circuit 13 terminates after completion of a previously specified tone, first relay 14 is again rendered inoperative, resulting in second relay 20 again being made inoperative due to the opening of normally open contact 143 of first relay 14. The relay actions of the first and second relays 14 and 20 are thus terminated, and the speaking path returns to its original stand-by state.

In the above system, the caller starts speaking in response to the reply message given by endless tape 17 and a beep tone that follows this message. Conventional automatic telephone answering apparatuses such as described above have the disadvantage that, since a beep tone emitted following the reply message is used to notify a caller that he can start leaving a message, it is difficult to judge the time when one can start talking. Also the beep tone is discordant and gives an unpleasant sensation. The fact that correct timing of the start of talking is difficult results in a wasteful running of the recording tape 23. It is therefore often impossible to completely record the desired message before the recording time runs out. Another problem is that it is difficult to take effective measures to notify the caller of the end of recording tape 23.

In cases in which a called subscriber uses an external telephone circuit to carry out a remote-control action for read-out of telephone messages that have been received while he is away, there is the inconvenience that there is no way of knowing how many telephone calls have been made or how many messages have been recorded until all of the recorded portion of the recording tape has been completely heard. Also, further loss of time results because it is only possible to know that the last message has been reached by letting the tape overrun for a bit.

Further problems with prior art apparatuses are that it is required to record information regarding time and other items before or after the message is recorded, it is necessary to have a complex arrangement using external equipment, and it is not possible to take effective measures to give the caller time information before or after the message is recorded.

Another problem with prior art apparatuses is that there is a tendency for the telephone to remain needlessly engaged, since there are no effective measures for detecting when the caller has replaced the receiver.

In cases in which the subscriber is not out but quite near the telephone, he might sometimes wish to simply hear a message from a caller without directly answering the telephone, but lack of provision for this does not give the subscriber that choice.

A further problem has been that the endless tape that carries a prerecorded reply message is played over and over again and therefore has a comparatively short life.

Another problem is that there are no effective measures in relation to the arrival of a number of calls during the same period, including the time when speaking is proceeding.

Yet another problem is that use of an endless tape and a recording tape frustrates attempts to reduce power consumption or to reduce the overall size and weight of the equipment.

A further problem is that maintenance of secrecy in remote-controlled read-out necessitates use of special complex equipment.

SUMMARY OF THE INVENTION

It is, therefore, an object of the present invention to reduce the drawbacks in an automatic telephone answering and recording apparatus.

According to the present invention, the automatic telephone answering and recording apparatus comprises: means for recording an incoming message sent by a caller over a telephone line on a first recording medium set therein; a speaking circuit; means responsive to a call signal sent by the caller for operating to connect the speaking circuit to the telephone line associated with the caller; means responsive to the operating means for transmitting an answering message previously recorded on a second recording medium set therein over the telephone line to the caller; means responsive to an ending of the answering message for detecting the state of the incoming message recording means and whether or not it is ready to record the incoming message; and means responsive to the detecting means for sending the caller a first aural synthesis output relating to the state of the incoming message recording means.

DESCRIPTION OF THE PREFERRED EMBODIMENT

The present invention will be described in detail with reference to the accompanying drawings consisting of FIGS. 2 through 10. Throughout the drawings, like reference letters and numerals will be used to designate like or equivalent elements.

A detailed description of one embodiment of the present invention will now be given with reference to the attached drawings.

Figure 2A:
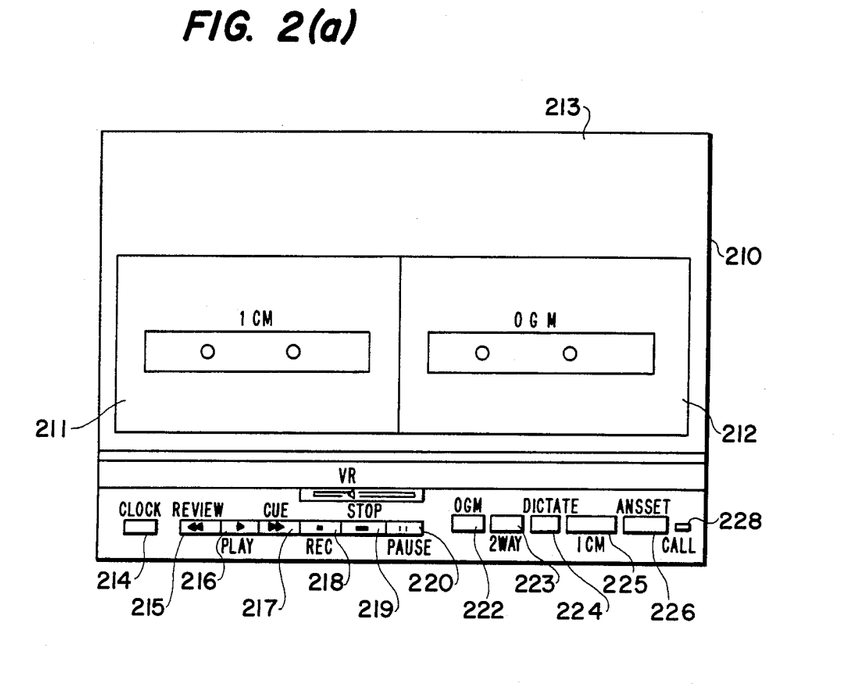
FIG. 2, consisting of (a)–(c), is an external view of one embodiment of an automatic telephone answering and recording apparatus according to the present invention.
Figure 2B:
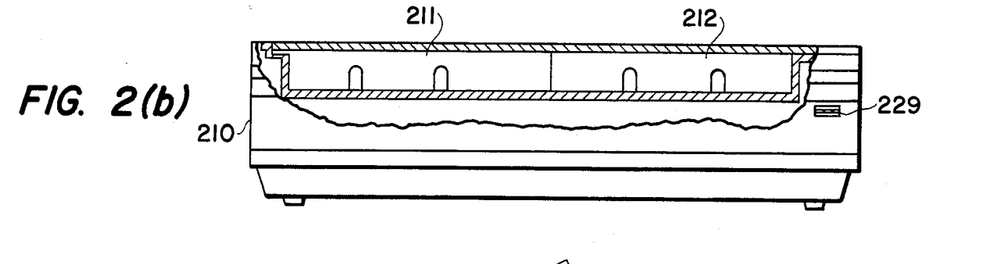
Figure 2C:
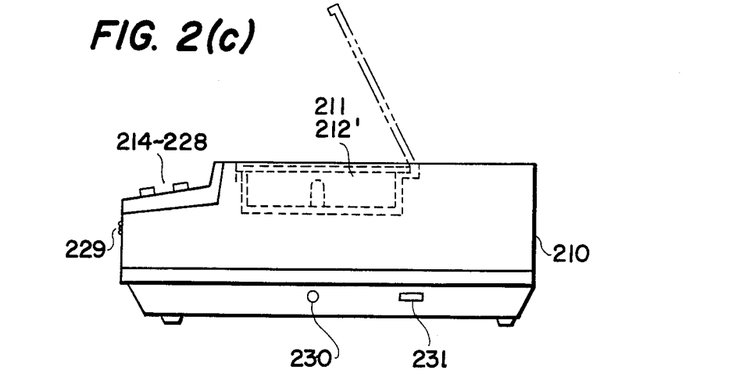

FIG. 2 is an external view of one embodiment of an automatic telephone answering and recording apparatus according to the present invention which is useable as an answer-phone. An ICM (incoming message) tape loading section 211 and an OGM (outgoing message) tape loading section 212, both of which use a compact cassette tape, are provided in parallel in an upper-stage plane portion of cabinet 210. The ICM tape for the ICM tape loading section 211 is the reel-to-reel type, and the OGM tape for the OGM tape loading section 212 is the endless type.

The inclined surface of a lower stage of cabinet 210 includes a clock operation key 214, which can cause production of sound indicating the current time from a sound production loudspeaker section 213 each time it is actuated, a review operation key 215 (also serving for rewind) for operating a tape recorder mechanism (which is of the logic control type using plungers, etc.) in a set state in the same way as for an ordinary tape recorder, a playback key 216, a cue key 217 (also serving for fastforward operation), a recording operation key 218, a stop key 219, a pause key 220, a key 222 for OGM operation for automatic telephone replies, a two-way operation key 223, a dictation key 224, an ICM playback key 225 and a key 226 for reply setting operation. A volume control 227 and an answer-phone display 228 are also provided.

The OGM operation key 222 serves to permit a reply message or an outgoing message that is to be given during the subscriber's absence to be recorded on the OGM tape (which is endless) via a built-in microphone, as described below. The contentent of the outgoing message can be checked by means of the playback key 216.

The reply setting operation key 226 serves for setting an automatic reply mode during the subscriber's absence, whereby, as described below, a response is made to callers and a caller's message can be recorded on the ICM tape.

The two-way operation key 223 is provided for when the subscriber wishes to answer the telephone and record the conversation. There is also included a function by which a sound signal (beep) is emitted at 15 second intervals during the conversation to notify the caller that recording is in progress.

The OGM playback key 225 serves to effect playback of what has been recorded on the ICM tape during the subscriber's absence. It is known whether calls have come in during one's absence by observing whether the answer-phone display 228 is lighted.

The dictation operation key 224 serves to permit the ICM tape to be used as in an ordinary cassette tape recorder, the various operating states being as specified by the operating keys 215–216.

An ear-phone terminal 230 and a recording time selection switch 231 are provided on the side of cabinet 210 for selective restriction of the ICM tape recording time permitted per call.

Figure 3:
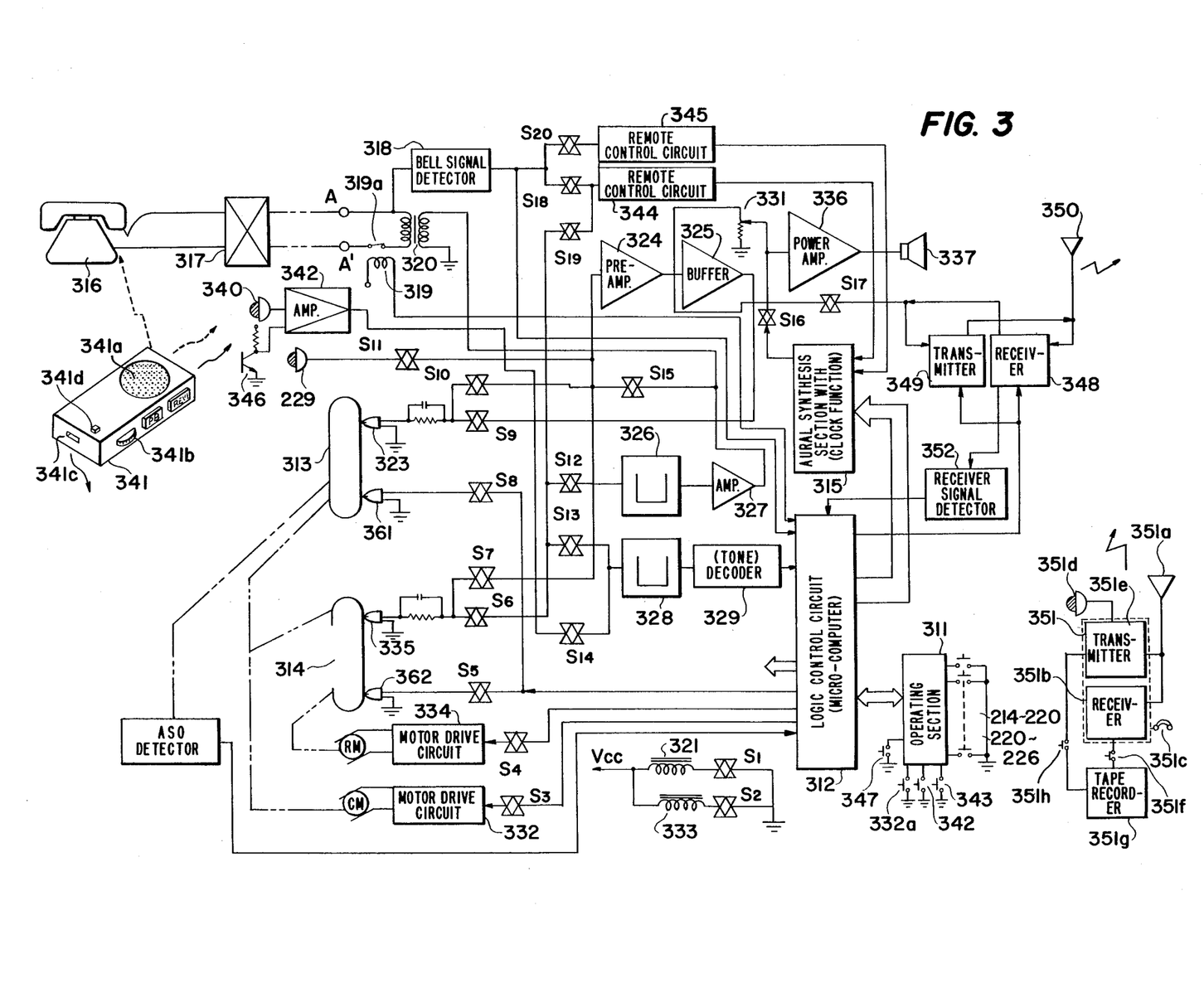
FIG. 3 shows the circuit configuration of the electrical circuit system of FIG. 2.

FIG. 3 is an electric circuit diagram of an automatic telephone answering device in which the present invention is applied and which is employable as an answer-phone. In the drawing, 311 is an operating section consisting of the above-described operating keys 214–216 and 222–226, etc. A logic control circuit 312 receives different operating signals from operating section 311 and is so constituted that, in response to these signals, it effects controls to bring OGM tape section 313, ICM tape section 314 and aural synthesis section 315 provided with a clock function into set states.

First, the construction and operation of the various parts will be described with reference to an example of the case where the above noted reply setting operation key 226 has been operated to permit operating section 311 to use the device in question as an answer-phone.

The logic control circuit 312 includes a microcomputer and it is assumed for explanatory purposes that it is in the standby state for an answer-phone reply in which various of its parts have first been made ready. In more detail, a leading end of the reply message on the OGM tape and an unrecorded portion just after the last recorded incoming message on the ICM tape are positioned in the OGM section 212 and the ICM section 211. The reply message has been previously recorded in the OGM tape section 313 by a procedure that is described below.

When, with the equipment in this standby state, a call signal (bell signal) from telephone 316 of an external caller arrives via exchange 317, bell signal detection circuit 318 detects when the call signal has sounded a set number of times, which can be specified beforehand, and supplies a detection signal to the logic control circuit 312. In response, the logic control circuit 312 supplies an ON signal to relay 319. The set number for call signal detection is typically two or more to avoid erroneous detection due to noise.

As a result, normally open contact 319a is closed, causing establishment of a speaking path wherein the telephone circuit A–A' is connected to a primary winding of a line transformer 320.

The logic circuit 312 also produces an output of various control signals in a set timing to bring analog switches S1–S21 into requisite states, and an OGM head slider plunger 321 and a capstan motor drive circuit 322 are now actuated via the analog switches S1 and S2 in order to effect playback drive of the OGM tape section 313.

As a result, the capstan motor CM is actuated and a prerecorded reply message on the OGM tape is transmitted to the speaking circuit via a path that goes successively through OGM head 323, analog switch S10, preamplifier 324, buffer amplifier 325, analog switch S12, filter 326 and amplifier 327 to the line transformer 320.

At this time, the reply message divides into two in the circuit following the buffer amplifier 326 and is supplied along a path going successively though analog switch S13 and filter 328 to a detector 329, which is therefore able to detect the reply message end section with the aid of a marking signal prerecorded on the OGM tape after the reply message.

The logic control circuit 312 is supplied with the marking signal indicative of this detection and is so arranged that logic control signal circuit 312 supplies a control signal to cause a set action in the end section of the reply message to aural synthesis section 315 that is provided with a clock function.

In more detail, the action is one in which, instead of a conventional beep sound for eliciting a message from the caller, there is produced an aural synthesis output such as, "Please speak" or the like, that has been previously memorized. This output is accompanied, if necessary, by aural synthesis output giving current time information, such as, "It is now X hours, Y minutes" and so on.

The aural synthesis section 315 is provided with a clock function transmitted to the speaking circuit via a path that goes successively through analog switch S16, volume controller 331, buffer amplifier 325 and then along the same path as the reply message.

Figure 4:
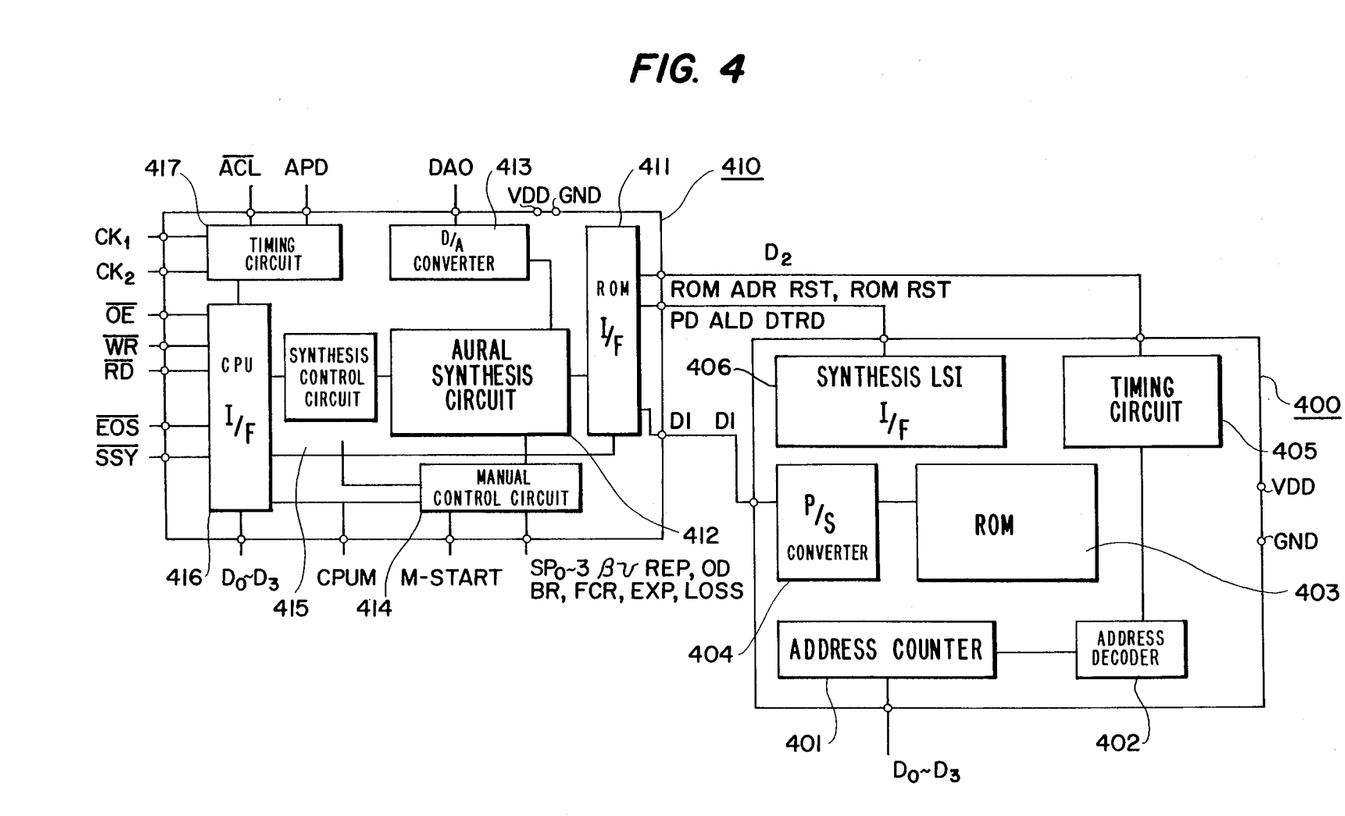
FIG. 4 is a partial circuit drawing showing a specific example of an aural synthesis section provided with a time function in FIG. 3.

FIG. 4 shows a specific example of an aural synthesis section 315 provided with a clock circuit. It includes a known PARCOR system aural synthesis CMOS LSI (the PARCOR system has been developed by Nippon Telegraph and Telephone Public Corporation) combining a special-purpose mask ROM 400 for aural data consisting of an address counter 401, an address decoder 402, a ROM 403, a P/S (parallel/serial) conversion circuit 404, a timing circuit 405 and a synthesis LSI I/F (interface) circuit 406 and a synthesis LSI 410 consisting of a ROM I/F circuit 411, an aural synthesis circuit 412, a D/A (digital to analog) converter 413, a manual control circuit 414, a synthesis control circuit 415, a CPU I/F circuit 416 and a timing circuit 417. An aural synthesis section 315 provided with a clock function can be realized by use of a known clock-function LSI, not shown, as a clock function section.

Figure 5:
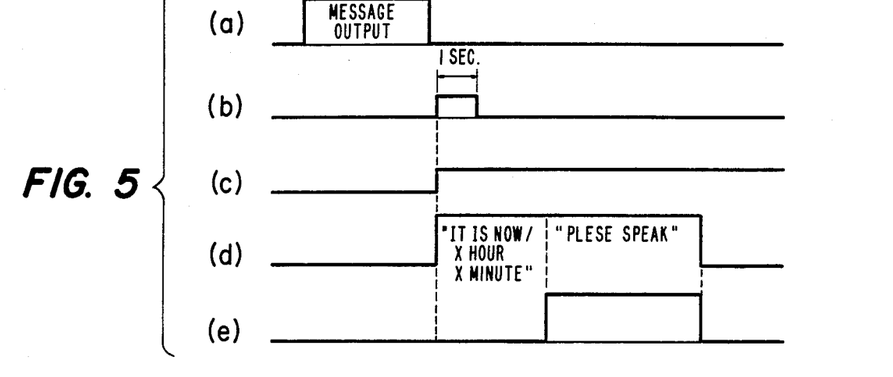
FIGS. 5(a)–(e) and 6(a)–(d) are timing charts for explanation of the operation of the circuits of FIGS. 2 and 3.

FIG. 5 is a timing chart of the above reply message and subsequent aural synthesis output of "It is now X hours Y minutes" and "Please speak" which is intended to elicit a message from a caller. The aural synthesis outputs of "It is now X hours Y minutes" and "Please speak" shown in FIG. 5(d) are produced in accordance with timing controls that are the result of taking the logical product of the end detection section signal of FIG. 5(b) that is provided at the trailing edge of the reply message shown in FIG. 5(a) and the reel motor forward rotation output as shown in FIG. 5(c). If, however, a time information transmission selector switch 332a which is an accessory to the operating section 311 (not shown in FIG. 2) has been switched off, the aural synthesis section 315 is supplied, via the logic control circuit 312, with a control signal that prohibits transmission of the time information and, as a result of which, only the aural synthesis output "Please speak" for eliciting a reply as shown in FIG. 5(e) is transmitted to the caller.

Since the ICM slider plunger drive output has already been supplied to logic control circuit 312 together with the above noted indicating forward rotation of the reel motor RM for recording drive of the ICM tape section 314, the ICM head slider plunger 333 and reel motor drive circuit 334 are brought into an operative state.

As a result, the reel motor RM is actuated and the above noted aural synthesis output of "It is now X hours Y minutes" and "Please speak" is recorded on the ICM tape via an analog switch S6 and the ICM head 335 on a branch subsequent to the buffer amplifier 325, following which the caller's message can be recorded smoothly, with no delay and with very natural timing on the ICM tape. In this case, the caller's messages goes successively via the line transformer 320, analog switch S15, preamplifier 324 and buffer amplifier 325 and, then, goes via the same recording path as the aural synthesis output to be recorded in the ICM tape section 314.

The time information may be recorded in the ICM tape section 314 not before the message from the caller but at the time of completion of the caller's message, and the form of such a record can, by provision of switch changeover means as required, be such that recording is effected on a single track or is divided between a plurality of tracks. Even if time information is not transmitted to the caller, it can be recorded on the ICM tape simply by actuation of the switch 332a and, if required, another switch can be provided to permit one to choose whether or not time information is to be recorded on the ICM tape.

It is also possible to have an arrangement wherein simple actuation of switch 332a for prohibiting transmission of time information to the caller effects masking by which the aural synthesis output that is transmitted to the caller to elicit a message is prevented from being recorded on the ICM tape, or if required one may have an arrangement wherein there is provided another switch to permit one to choose whether or not the aural synthesis output eliciting a message is recorded in the ICM tape section 314.

Recording of time information in the ICM tape section 314 is done to provide the subscriber with the convenience of knowing, on playback of the tape, at what times particular telephone messages were left during his absence. However, if the subscriber is away not for just one day but for several days, it can become unclear what day a given recorded time corresponds to. As an effective measure for this kind of situation, it is simply necessary to make the configuration of the aural synthesis section 315 such that the time information is preceded by weekday information which notes the day of the week from Sunday to Saturday or information that indicates the number of days that have elapsed and specifies, e.g., from day one to day four.

It is possible to have an arrangement in which there is an output of these types of information only on the day of the week of the number of days that have elapsed, and as well as having the above-described output forms, these types of information can be indicated by suitable codes or by a number of beeps, etc.

If the end of the ICM tape arrives while a caller's message is being recorded in the ICM tape section 314, this is detected by the tape end detection section 338.

Tape end detection output of this section is supplied to the logic control circuit 312, which is so constituted that it supplies to the aural synthesis section 330 a control signal for causing a set action at the end of the ICM tape.

This action is one whereby the caller is notified of the arrival of the end of the ICM tape by transmission of an aural synthesis output such as "The tape has ended", the transmission path needed for this being the same as that followed by the above-described aural synthesis output of "Please speak".

Figure 6:
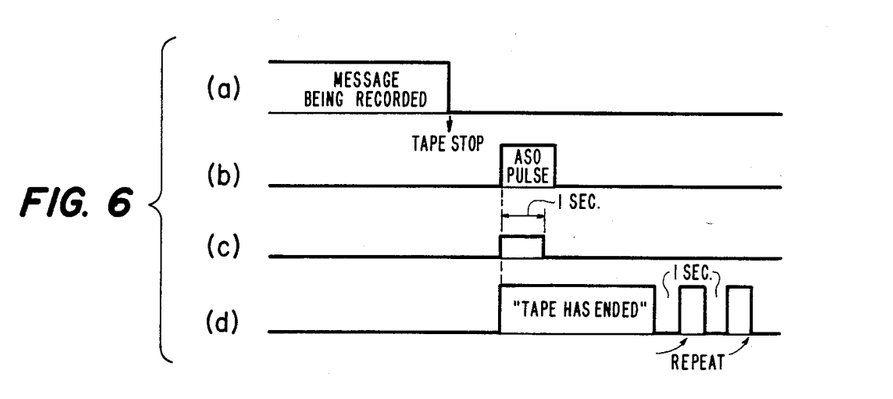

FIG. 6 is a timing chart of transmission of this end information such as "The tape has ended". FIG. 5(a) of the chart shows stopping of the ICM tape (recording), FIG. 5(b) the emission of a tape end detection signal, FIG. 5(c) the emission of the control signal, and FIG. 5(d) transmission of the aural synthesis output "The tape has ended" which is timed by taking the logical product of FIGS. 5(b) and 5(c).

If use is made of a tape recorder with an auto-reverse function, it is possible to have an arrangement wherein the message "Please wait a little" is transmitted following "The tape has ended" and then, when auto-reverse action has been completed, an aural synthesis output such as "Sorry to have kept you waiting. Please speak now" can be produced.

In the above, in order to record a reply message in the OGM tape section 313, it is simply necessary to actuate the OGM operation key 222 of the operation section 311 and enter the required reply message via the built-in microphone 229. This action causes various control signals for establishment of a reply message recording state to be supplied from the logic control circuit 312 to the OGM tape section 313. In more detail, there is established a recording route that goes successively through the built-in microphone 229, an analog switch S11, the preamplifier 324, the buffer amplifier 325 and an analog switch S9 to the OGM head 323 which functions as a recording head.

To play back telephone messages that have been recorded in the ICM tape section 314 during one's absence, it is only necessary to actuate the ICM playback key 225 of the operating section 311. This results in various control signals for establishment of a playback drive being supplied from the logic control circuit 312 to the ICM tape section 314, and there is established a playback route that goes successively via the ICM head 335, analog switch S7, preamplifier 324, volume controller 331 and output amplifier 336 to loudspeaker 337.

As a measure to prevent sound being emitted from the loudspeaker 337 during the above-described use of the device as an answer-phone, the output amplifier 336 is supplied with power source voltage for drive thereof only when the device is in this playback state.

At the same time of recording in the OGM tape section 313 or the ICM tape section 314, requisite erasure signals can be supplied from the logic control circuit 312 via an analog switch S8 or S5 to an erasure head 361 or 362.

It is also possible for telephone messages that have been recorded in the ICM tape section 314 during one's absence to be played back by remote-control action without actuating playback key 225 of the operating section 311 and without using the telephone circuit.

This remote-control playback operation is useful when one is not absent but is comparatively nearby, such as in another room. A feature in this case is that it is possible to directly establish a remote-control playback mode by means of sound waves.

All that it is necessary to do is to use a remote-control operation unit 341 that is, more or less, the same as a remote-control operation unit employed for remote-control operation playback using the telephone circuit and to emit from the loudspeaker 341a of this unit call sound waves that are coded so as to provide requisite secrecy and which are directed to a remote-control microphone 340 that is provided in the device main body as shown in FIG. 3.

Output from microphone 340 when it has received the call (sound waves) is supplied via a path that goes successively though amplifier 342 with the same band characteristic as the telephone circuit, analog switch S14 and filter 328 to detector 329 (which in this case functions as a tone decoder), and detector 329 thus detects that there is a call for remote-control playback operation.

The logic control circuit 312 is supplied with a detection signal indicative of this and can supply various control signals for rewind of the ICM tape section 314 and establishment of a playback state (skipping also being possible if required), following which the same playback route as described above is established.

As a result of this, the subscriber can hear a message recorded on the ICM tape because of the emission from loudspeaker 337, even if he is not by the side of the actual device itself.

Since, unlike the case in which the telephone circuit is used and the call sound is introduced directly into the telephone, the remote-control operation unit 341 is a unit which is located at a certain distance and with which call (sound waves) is introduced into the microphone 340, it is necessary to have an output that is comparatively large in comparison to that used for telephone circuit operation and is proportional to the distance of the unit. In view of this, in addition to a group of set operation mode selection keys, the remote-control operation unit 341 is provided with a regulator 341b for varying output so as to ensure that it functions properly without risk of error, whatever the state of the output that is used.

The remote-control operation unit 341 is also made such that, instead of emission of a call (sound waves) coded to provide requisite secrecy from its loudspeaker 341a it can, as the result of changeover action of switch 341d, produce equivalent output in the form of call light waves from a light-emitting element 341c. In other words, different call outputs can be used depending upon which is the more advantageous in view of the distance or situation with regard to intermediate obstacles at a particular time.

When the remote-control playback operation mode is employed using call light waves from the light-emitting element 341c, and not the telephone circuit, the call light waves are subjected to photo-electric conversion by light-receiving element 346 such as a phototransistor that is provided at the device main body end approximately along side the above noted microphone 340 for reception of call sound waves. The call light waves are led along the above-described path from the amplifier 342 on and are processed in the same was as the call sound waves, and so function to establish the requisite playback state.

A description will now be given of the case in which the remote-control playback operation mode is made using the telephone circuit. In this case, as a result of selection action by operation keys 342 and 343 which are provided on the operating section as shown in FIG. 3, it is possible to have not just rewind of the ICM tape section 341 and production of playback drive, but also to have emission of the aural output of the telephone calls that have been received during an absence and of the termination of the messages for playback.

In the situation where the operation key 342 has been actuated, the subscriber must first use the above-described remote-control operation unit 341 to send out a signal indicating that the playback operation mode is to be a mode of remote-control from an external telephone. The remote-control signal in this case goes via the telephone circuit and, like ordinary aural signals, is supplied via a path going through line transformer 320, analog switch S15, the preamplifier 324, buffer amplifier 325, analog switch S13 and filter 328 to detector 329 (which in this case functions as a tone decoder and remote-control signal decoder). The detector 329 thus detects the arrival via the telephone circuit of a call from the subscriber specifying remote-control playback operation.

The logic circuit 312 is supplied with a detection signal indicative of this and is so constituted that, in response, it supplies various control signals that bring the ICM tape section 314 into a playback drive state in the same manner as described above and causes the playback output of this section to be transmitted to the speaking circuit via a path going successively through the ICM head 335, analog switch S7, preamplifier 324, buffer amplifier 327 and line transformer 320. It can also supply a control signal which brings a first remote-control circuit 344 into a drive state, thereby making it possible for aural synthesis output in the form of "Message playback has ended" to be sent out from the aural synthesis section 315 to the speaking circuit, via the same route as for the above noted outputs, immediately on termination of the playback output of the ICM tape section 315.

What happens in this case is that the count of the number (N) of times that a bell signal has been detected by the bell signal detection circuit 318 is set beforehand in the first remote-control circuit 344 in the form of (N−1) via analog switch S18. Subsequently, when the subscriber uses the telephone circuit to make a call for establishing a remote-control playback mode, the playback output from the buffer amplifier 325 is read via analog switch S19 and the number of incoming messages is counted. The two counts are successively compared and when their values coincide the first remote-control circuit 344 supplies the aural synthesis section 315 with a control signal for causing production of the set aural synthesis output such as described above for giving notification of the end of message playback.

The reason why the number (N) of times bell signals detected by the bell signal detection circuit 318 is counted as (N−1) is that one of the bell signals detected is a call from the subscriber for remote-control playback operation.

A description will now be given of the case in which the operation key 343 has been actuated. The remote-control playback operation mode as such is the same as described above, but in this case things are arranged so that when there is a call specifying remote-control playback operation, the aural synthesis output giving information on the number of calls that have been received so far during the subscriber's absence, e.g., output in the form "There have been three calls", is transmitted to tne speaking circuit from the aural drive of the ICM tape section 314.

In more detail, in this case the count of the number (N) of times that bell signals have been detected by the bell signal detection circuit 318 is previously set via an analog switch S20 in a second remote-control circuit 345, in the form (N−1) for the same reason as noted above, and when subsequently the subscriber uses the telephone circuit to make a call specifying the remote-control playback operation mode, the value of this count is supplied to the aural synthesis section 315. In response, aural synthesis section 315 makes a selection of set aural data from previously synthesized and analysed data and produces a sound signal in correspondence to the count value input.

Actuation of both operation keys 342 and 343 results in performance of both of the above-described functions. The first and second remote-control circuits 344 and 345 may be easily realized by combinations of known counter circuits, latch circuits, non-recording detection circuits, comparison circuits, subtraction circuits, etc.

The device also includes means to stop supply of power voltage to the output amplifier 336 and so prevent emission of playback sound from the loudspeaker 337 when the remote-control playback operation mode is this mode using the synthesis telephone circuit.

Next, a description will be given of a remote-control reply mode that is provided in addition to the above answer-phone functions.

As in the case described above wherein a remote-control playback operation mode is established without using the telephone circuit, this mode is of advantage when the subscriber is not away but is comparatively nearby, such as in another room, and is one wherein the device is still caused to function as an answer-phone, but it is also possible for the subscriber, while in a different location, to reply to and outside telephone call.

In more specific detail, it is simply necessary to actuate an operation key 347 that is provided in the operating section 311 as shown in FIG. 3. When this key 347 is actuated, reception of a telephone call from a caller results in performance of the series of answer-phone functions comprising transmission of a reply message, transmission of an aural synthesis output inviting the caller to leave a message and recording the caller's message as described above and, at the same time, there is supplied control signals from the logic control circuit 312 to bring a receiving section 348 and a transmission section 349 into a driven state.

As a result, output of the preamplifier 324 in the path over which messages from callers are recorded (this may also be the reply transmission path) is supplied to the transmitting section 349 via an analog switch S17 and then is transmitted via an antenna 350, e.g., in the form of CB (citizens band) radio waves.

The transmitted waves proceed via antenna 351a and the receiving section 351b of a transceiver 351 (e.g., in the form of a transceiver that the subscriber in the separate location has at hand), and the subscriber can thus listen in via earphones or a loudspeaker 351c. If, on receipt of the message, the subscriber makes a reply into microphone 351d on the transceiver 351, this reply is transmitted via the transmission section 351e to the receiving section 348 via antenna 350 at the automatic telephone answering device end. It is then transmitted to the speaking circuit via a path that goes successively through the analog switch S17, buffer amplifier 325, analog switch S12, filter 326, amplifier 327 and line transformer 320.

A detector 352 is coupled between the receiving section 348 and the logic control section 312 to detect the radio reply message from transceiver 351. Detector 352 supplies a detected signal to the logic control circuit 312 upon the receipt of the reply message so that the logic control circuit 312 operates to deactivate the OGM section 313. The logic control circuit 312 operates to maintain activation of the OGM section 313 when the detector 352 fails to detect the reply message on the receiving section 348.

If the subscriber switches on switch 351f on the transceiver 351, the message from the caller that is received by receiving section 351b is recorded in tape recorder section 351g, which offers the convenience that, if required, the subscriber can play back the caller's message straightaway without having to deliberately go to where the automatic telephone answering device is located.

If switch 351h also is switched on at the same time, this makes it possible for so-called two-way system recording in which the subscriber's reply is recorded via the transmission section 351e in the tape recorder section 351g to be effected by the subscriber's side, making subsequent playback more convenient.

The tape recorder 351g is made integral with the transceiver 351 and is preferably a micro-cassette type as this makes dubbing easier.

Figure 7:
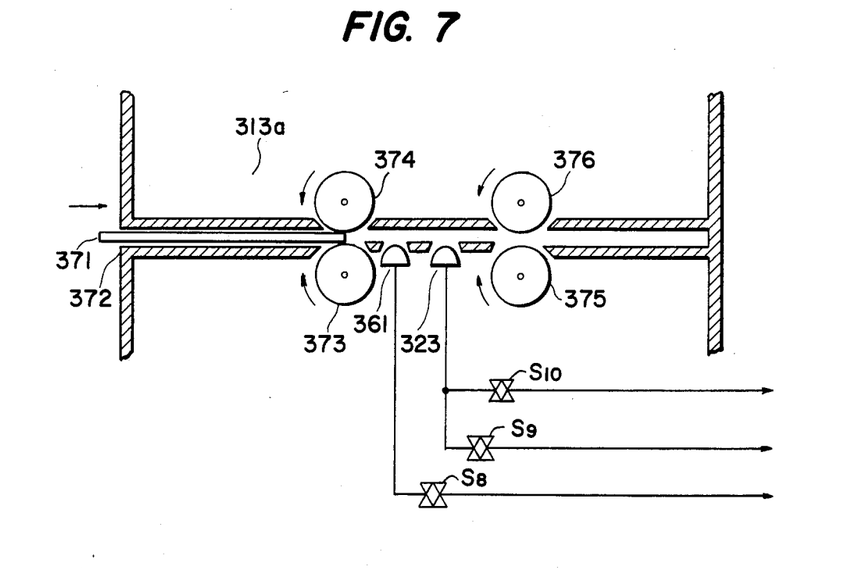
FIGS. 7 through 10 are structural drawings of certain parts that show other embodiments of the present invention.

FIG. 7 shows the case in which, instead of the endless OGM tape section 313 shown in FIG. 3, use is made of an OGM card section 313a. Combination of this with the ICM tape section 314 gives the advantage that instead of two tape recorder mechanisms being necessary, the automatic telephone answering device only needs one tape recorder mechanism for the ICM tape section 314, which makes construction simpler. Use of these OGM cards also offers the advantage that, when a plurality of OGM cards for different purposes is prepared, the cost is lower than use of an endless OGM tape.

In this case, use is made of OGM cards 371 in the form of magnetic cards such as employed for cash cards. On arrival of an external telephone call, an OGM card 371 loaded in a card loading section 372 is carried over the head section 323 by rollers 373-376 that are actuated with the same timing as used for the capstan motor CM referred to above and a prerecorded reply message is reproduced. When this has ended, the card is automatically returned to its initial position.

The OGM cards are not limited to being magnetic cards but other forms of cards may be employed and a bar code system or other recording system may be employed as the recording system.

Figure 8:
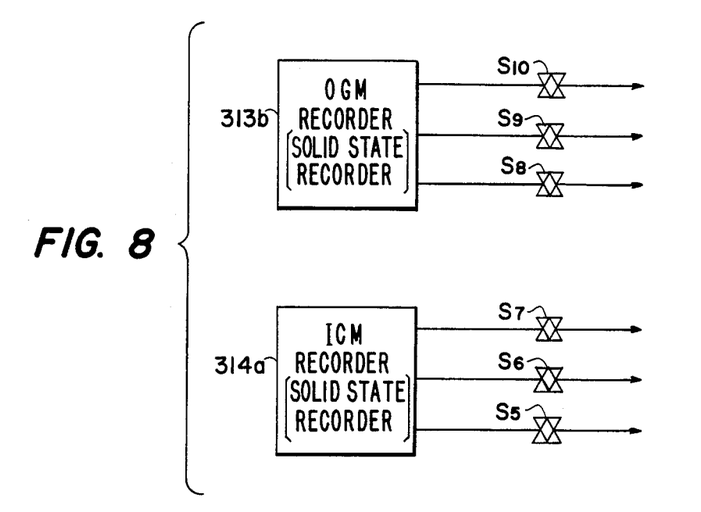

FIG. 8 shows the case in which an OGM recorder section 313b and an ICM recorder section 314a comprising solid state recorders are respectively used instead of the OG tape section 313 and the ICM tape section 314. This offers the advantage that the automatic telephone answering device can be realized solely by solid state circuitry using electronics technology, without there being any need at all for conventional tape recorder mechanisms. In other words, the construction can be simplified and it is possible to design for greater compactness, reduced weight, lower power consumption and greater ease of operation.

Figure 9:
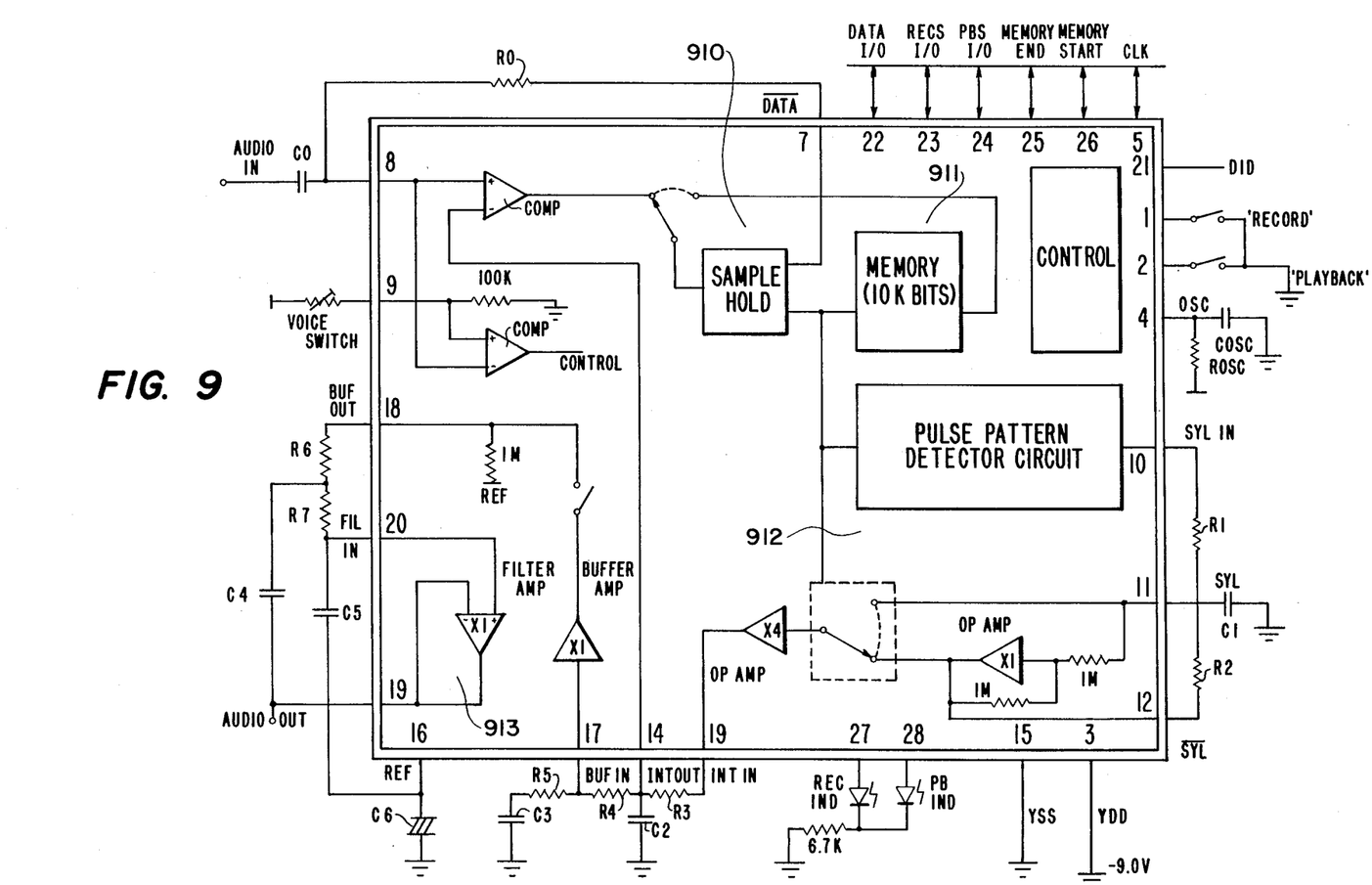

The OGM recorder section 313b and the ICM recorder section 314a in this case both make use of solid state recorders. As shown in FIG. 9, in such a solid state recorder at the time of recording, recording signals that have passed through a preamplifier, etc. are digitalized by an A/D converter 910 and then stored in an internal memory 911, while at the time of playback, digital data stored in the internal memory 911 is read out sequentially and restored to analog signals by a D/A converter 912 and then produced as output with sampling noise removed by a filter 913. The corresponding playback signals are transmitted through a preamplifier and output amplifier to a loudspeaker, or are transmitted to the speaking circuit as described above.

Further, since the OGM recorder section 313b and the ICM recorder section 314a are constituted by solid state recorders that effect sequential digitalization and real-time processing of recording and playback and permit equivalent substitution with aural synthesis technology, they can be constituted integrally with the aural synthesis section 315 shown in FIG. 3.

Figure 10:
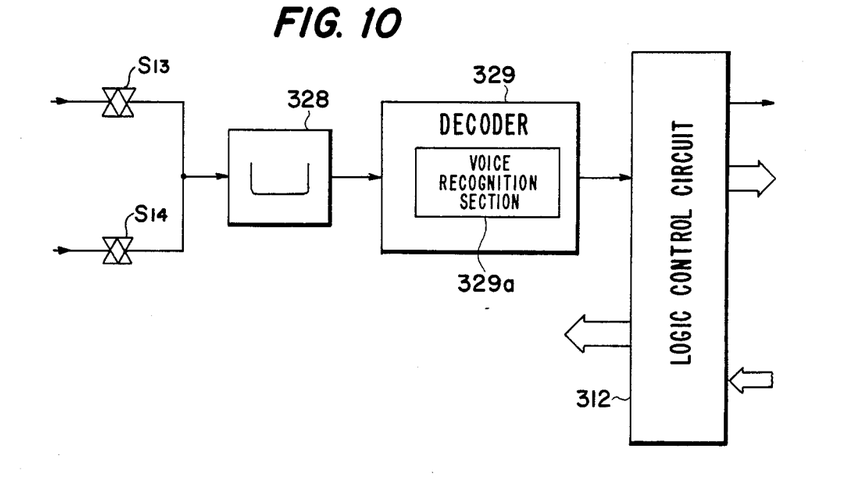

FIG. 10 shows the case wherein detector 329 shown in FIG. 3 is provided with a voice recognition section 329a. Instead of the special-purpose remote-control playback operation unit 341 being used to establish the above-described remote-control playback operation mode using the telephone circuit, this mode can thus be established as the result of recognition of a message (e.g., "Play back messages"), that is received from the telephone circuit and is given to the voice of the subscriber (or the voices of a number of people), which has previously been recorded in the voice recognition section 329a in the same band as used for the telephone circuit.

The invention is not limited to the embodiments that have been described above and are shown in the drawings but a variety of modifications and applications are possible without departure from the essence of the invention.

What is claimed is:

1. An automatic telephone answering and recording apparatus comprising:
    recording means for recording an incoming message sent by a caller over a telephone line on a first recording medium;
    a speaking circuit;
    first means responsive to a call signal sent by the caller for operating to connect the speaking circuit to the telephone line associated with the caller;
    second means responsive to said first means for transmitting an answering message previously recorded on a second recording medium over the telephone line to the caller;
    detecting means responsive to an ending of the answering message for detecting the state of said recording means as to whether or not it is ready to record an incoming message; and
    transmitting means responsive to said detecting means for transmitting to the caller a first aural speech synthesis output identifying the state of said recording means.

2. An automatic telephone answering and recording apparatus according to claim 1, wherein said recording means and the first recording medium are respectively a magnetic tape recorder means and a cassette tape, and said detecting means detects whether the cassette tape is being driven.

3. An automatic telephone answering and recording apparatus according to claim 2, wherein said detecting means is a tape drive starting detecting means for generating an electric signal in response to the tape drive starting.

4. An automatic telephone answering and recording apparatus according to claim 3, wherein said transmitting means transmits an aural speech synthesis output inviting the caller to transmit a message when said tape drive starting detecting means detects the tape drive starting of the cassette tape.

5. An automatic telephone answering and recording apparatus according to claim 4, further comprising:
   means for generating a clock signal;
   means for generating a second aural speech synthesis output indicating time information in response to the clock signal; and
   means for recording the second aural speech synthesis output on the incoming message recording tape before or after the caller's message.

6. An automatic telephone answering and recording apparatus according to claim 2, wherein said detecting means is a tape stop detecting means for generating an electric signal in response to the tape stop.

7. An automatic telephon answering and recording apparatus according to claim 6, wherein said transmitting means transmits a first aural synthesis output notifying the arrival of the end of the cassette tape when said tape stop detecting means detects the stoppage of the cassette tape.

8. An automatic telephone answering and recording apparatus according to claim 1, further comprising:
   means for generating a clock signal;
   means for generating a second aural speech synthesis output indicating time information in response to the clock signal; and
   means for sending the caller the second aural speech synthesis output before or after the first aural synthesis output.

9. An automatic telephone answering and recording apparatus according to claim 8, further comprising:
   means for recording the second aural speech synthesis output on said incoming message recording medium before or after the caller's message.

10. An automatic telephone answering and recording apparatus according to claim 1, wherein said incoming message recording means and said first recording medium include respectively an analog to digital converter and a RAM.

* * * * *